(12) United States Patent
Courjaud et al.

(10) Patent No.: US 8,995,488 B2
(45) Date of Patent: Mar. 31, 2015

(54) OPTICAL AMPLIFIER AND LASER INCORPORATING SUCH AN AMPLIFIER

(75) Inventors: Antoine Courjaud, Leognan (FR); Sandrine Anne Ricaud, Gif sur Yvette (FR); Frederic Pierre Henri Jacques Druon, Orsay (FR); Jean-Louis Doualan, Rots (FR); Patrice Jean-Pierre Camy, Caen (FR)

(73) Assignee: Amplitude Systemes, Pessac (FR)

( * ) Notice: Subject to any disclaimer, the term of this patent is extended or adjusted under 35 U.S.C. 154(b) by 33 days.

(21) Appl. No.: 13/816,551

(22) PCT Filed: Aug. 16, 2011

(86) PCT No.: PCT/FR2011/051921
§ 371 (c)(1),
(2), (4) Date: Feb. 12, 2013

(87) PCT Pub. No.: WO2012/022915
PCT Pub. Date: Feb. 23, 2012

(65) Prior Publication Data
US 2013/0142208 A1 Jun. 6, 2013

(30) Foreign Application Priority Data

Aug. 18, 2010 (FR) ..................... 10 56650

(51) Int. Cl.
*H01S 3/16* (2006.01)
*H01S 3/08* (2006.01)
(Continued)

(52) U.S. Cl.
CPC . *H01S 3/08* (2013.01); *H01S 3/042* (2013.01); *H01S 3/0071* (2013.01); *H01S 3/025* (2013.01);
(Continued)

(58) Field of Classification Search
CPC ..... H01S 3/1618; H01S 3/165; H01S 3/1645; H01S 3/1653; H01S 3/094038; H01S 3/0941; H01S 3/09415
See application file for complete search history.

(56) References Cited

U.S. PATENT DOCUMENTS 3,453,215 A 7/1969 Carnall et al.
5,123,026 A 6/1992 Fan et al.
(Continued)

FOREIGN PATENT DOCUMENTS

WO 2006/037076 4/2006

OTHER PUBLICATIONS

Lucca et al., High-power diode-pumped Yb3+:CaF2 femtosecond laser, Dec. 1, 2004, Optics Letters, vol. 29, No. 23, pp. 2767-2769.*
Vannini et al., High efficiency room temperature laser emission in heavily doped Yb:YLF, Jun. 25, 2007, Optics Express, vol. 15, No. 13, pp. 7994-8002.*

(Continued)

*Primary Examiner* — Armando Rodriguez
*Assistant Examiner* — Sean Hagan
(74) *Attorney, Agent, or Firm* — Young & Thompson

(57) ABSTRACT

A high-gain optical amplifier for a wave to be amplified at a wavelength referred to as the emission wavelength, includes: optical pumping elements (4) producing a pump wave at a wavelength referred to as the pump wavelength; a solid amplifying medium (1) that is doped with active ions, the solid amplifying medium being capable of emitting laser radiation at the emission wavelength when the medium is pumped by the pumping elements; cooling elements (2) capable of cooling the solid amplifying medium to a temperature of no higher than 250 Kelvin; and optical multiplexing elements capable of coupling together the pump wave and the wave to be amplified in the amplifying medium. The amplifying medium has Stark sublevels contained within a spectral domain ranging over less than 200 $cm^{-1}$ (approximately 20 nm, when expressed in wavelength). A laser including a resonant optical cavity and an amplifier are also described.

12 Claims, 3 Drawing Sheets

(51) Int. Cl.
*H01S 3/042* (2006.01)
*H01S 3/00* (2006.01)
*H01S 3/02* (2006.01)
*H01S 3/094* (2006.01)
*H01S 3/0941* (2006.01)
*H01S 3/102* (2006.01)

(52) U.S. Cl.
CPC ..... *H01S 3/094053* (2013.01); *H01S 3/094084* (2013.01); *H01S 3/09415* (2013.01); *H01S 3/1022* (2013.01); *H01S 3/1618* (2013.01); *H01S 3/165* (2013.01)
USPC .......................................................... 372/41

(56) References Cited

U.S. PATENT DOCUMENTS

| | | | |
|---|---|---|---|
| 5,272,710 | A | 12/1993 | Sumida et al. |
| 5,982,792 | A * | 11/1999 | Kasamatsu et al. ............. 372/35 |
| 6,195,372 | B1 | 2/2001 | Brown |
| 2005/0157382 | A1* | 7/2005 | Kafka et al. .................. 359/346 |
| 2009/0274181 | A1 | 11/2009 | Akahane et al. |
| 2010/0040105 | A1 | 2/2010 | Rocca et al. |

OTHER PUBLICATIONS

International Search Report dated Oct. 26, 2011, corresponding to PCT/FR2011/051921.
David C. Brown; "Ultrahigh-Average-Power Diode-Pumped Nd: YAG and Yb: YAG Lasers"; vol. 33, No. 5, May 1, 1997.

* cited by examiner

OPTICAL AMPLIFIER AND LASER INCORPORATING SUCH AN AMPLIFIER

BACKGROUND OF THE INVENTION

1. Field of the Invention

The present invention relates to a low-quantum-defect optical amplifier and a laser including such an amplifier.

2. Description of the Related Art

Placed inside a resonant optical cavity, an optical amplifier makes it possible to realize a laser and such to produce a coherent light flux.

Moreover, conventionally, to produce powerful laser beams, amplifiers are used. To amplify a laser beam, at a determined emission wavelength, an optical pump is used whose wavelength is lower than that of the emission wave and which, according to the prior art, is relatively far from the emission wavelength.

It is generally considered that the amplification gain is maximum for pump and emission wavelengths that are relatively far from each other. From then on, simple dichroic filters can be used to separate the radiations at wavelengths near to the pump wavelength. They allow coupling of the pump light flux in the amplifying crystal and extraction of the amplified useful flux.

The quantum defect ρ is defined as the parameter that represents the difference between laser emission wavelength ($\lambda_L$) and pump wavelength ($\lambda P$) of an optical amplifier:

$$\rho = 1 - \frac{\lambda_P}{\lambda_L}$$

The today high-performance amplifiers have a quantum defect higher than a minimum value of the order of 10%.

Various crystals may be used as an amplifying medium. In particular, ytterbium-ion-doped $CaF_2$ crystals have sometimes been used, at ambient temperature, in laser systems operating in femtosecond regime. Still in this case, the pump wavelength is relatively far from the emission wavelength.

In this context of high-power laser beam production, the document U.S. Pat. No. 6,195,372 describes various cryogenic-temperature cooling devices for YAG-rod solid lasers. According to this document, the cryogenic cooling, i.e. near to 100-150 K, of a YAG-rod laser allows simultaneously increasing the thermal conductivity and reducing the thermal expansion coefficient of the material, which leads to an increase of the laser mean power.

SUMMARY OF THE INVENTION

One objective of the invention is to develop an optical amplifier or a laser with a high mean power and/or a high amplification gain. This high mean power laser system may operate either in continuous regime or in pulse regime.

To reach this objective, the inventors exploit the fact that the spectroscopic and thermo-mechanical properties of the amplifying media depend essentially on their working temperature. However, due to the complexity of the physical effects involved, it is not possible to foresee the properties of a given material at low temperature. In particular, it is not possible to foresee the operation of a solid laser at low temperature for some material or other. There are no spectrally-resolved measurements of the cross sections at low temperatures.

Therefore, these materials have two advantages at low temperature. The laser emission takes place naturally for a low quantum defect, which results in a low thermal deposition, and the optical properties are not much affected for a given heat deposition. Within the framework of the invention, such elements have been advantageously used to design high-performance devices by selecting the amplifying material, its working temperature and, more generally, all its conditions of use in an amplifier.

The present invention has thus for object a high-gain laser amplifier, optimized for high mean powers and/or for the high energies using solid laser materials. More precisely, it relates to a high-gain optical amplifier for a wave to be amplified at a wavelength referred to as the emission wavelength, comprising:

optical pumping means producing a pump wave at a wavelength referred to as the pump wavelength;

a solid amplifying medium that is doped with active ions, said solid amplifying medium being capable of emitting laser radiation at an emission wavelength when it is pumped by said pumping means;

cooling means capable of cooling said solid amplifying medium to a temperature lower than or equal to 250 Kelvin;

optical multiplexing means capable of coupling together the pump wave and the wave to be amplified in the amplifying medium.

According to the invention, the solid amplifying medium has Stark sublevels contained within an interval of energy of less than 200 $cm^{-1}$ (corresponding approximately to a spectral difference of 20 nm when expressed in wavelength).

In various preferred embodiments, the amplifier of the invention has the following characteristics, possibly combined with each other:

the active ions are ytterbium ions.

The ytterbium ions have the main property that is desired here, i.e. not much dispersed Stark sublevels. Moreover, they have low quantum defects. However, other ions, such as erbium ions for example, may be implemented within the framework of the invention.

the host matrix is an ytterbium-doped fluoride.

said fluoride is part of the set consisted by YLF, $KYF_4$, LiLF, BYF, $CaF_2$, $SrF_2$, $BaF_2$.

Good results may also be obtained with fluorides codoped for example with Na.

the amplifying medium is Yb:$CaF_2$, it is cooled to 77 K, the pump wavelength is 981 nm, and it is capable of amplifying a wave at 992 nm.

the host matrix is part of the zirconia, the Scheelites, the tungstates.

As zirconia, it may be mentioned $YVO_4$ and $GdVO_4$, as Scheelites, $BaWO_4$, $PbWO_4$, $SrWO_4$ and $CaWO_4$, as tungstates, KGW, KLuW and KYW. Some oxides as the YAP, the silicates as the YSO, the borates as the YAB also give good results.

the quantum defect ρ of said amplifying medium is lower than 2% at a temperature lower than or equal to 250 Kelvin.

the pump wavelength is comprised between 970 and 990 nm and the emission wavelength is higher than 990 nm.

said multiplexing means comprise a filter chosen among an interferential filter, a Volume Bragg grating, a polarizing optical component and/or an optical component capable of angularly separating a beam along a pump axis from a beam along an emission axis, a modal filter.

The invention also relates to a laser implementing such an amplifier.

The present invention also relates to the characteristics that will become evident from the following description and that will be considered either alone or in any technically possible combination thereof.

BRIEF DESCRIPTION OF THE DRAWING FIGURES

This description is given by way of non-limitative example and will allow a better understanding of how the invention can be implemented, with reference to the appended drawings, in which:

FIGS. 1 to 4 schematically show a device according to the invention implementing various multiplexing devices;

DETAILED DESCRIPTION OF THE INVENTION

Figure 1:
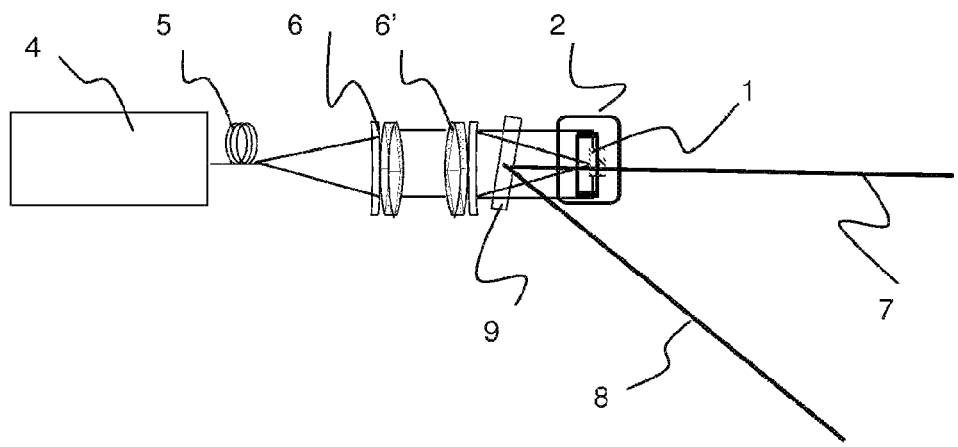

The optical amplifier of the invention advantageously uses a solid crystal, in particular a Yb:CaF$_2$ crystal cooled to a cryogenic temperature.

In a particular embodiment described as a non-limitative example, the Yb:CaF$_2$ crystal is pumped by a diode and works at a cryogenic temperature of 77 K. It is placed within a laser cavity. A laser power of 97 W at 1034 nm has been extracted for a pump power of 245 W and an output of 62 W. The corresponding whole efficiency of extraction is of 65% with respect to the absorbed pump power.

The crystal 1 is preferably a 2.2% Yb-doped Yb:CaF$_2$ crystal. This crystal 1 of 5 mm long is placed in a cryostat 2, on a copper fixture directly cooled to 77 K by liquid nitrogen. The thermal contact of the crystal 1 is made through the lower and upper surfaces of 5×7 mm$^2$ surface area each. A sheet of indium of 200 μm thick is inserted between the crystal 1 and the copper fixture to provide the thermal contact and to avoid any stress in the crystal due to a differential expansion with respect to the fixture. The liquid nitrogen may thus be transferred into the cryostat without special precaution, without any problem due to a thermal shock can affect the crystal.

The crystal 1 comprises no surface coating and is slightly bias cut, with an angle of 2.5 degrees. The crystal is tilted with respect to the optical axis, to avoid the effects of coupling of the flux reflected in the laser cavity. The Yb:CaF$_2$ crystal is pumped by a diode 4 having a power of 245 W and coupled via an optical fiber 5 of 400 μm diameter and 0.22 numerical aperture (NA). The output of fiber 5 is imaged on the crystal 1 using two triplet lens optical systems 6 and 6' (50 mm/50 mm).

The global transmission on the imaging system is first measured using a dichroic mirror and a first cryostat window having a transmission of 87% so as to obtain a maximum incident power on the crystal of 212 W.

Various measurements are taken simultaneously for a given working point. Such measurements include the mean power of the output coupler and of one of the Fresnel reflections, the recording of the beam profile and of the spectrum, and a part of the transmitted pump power to evaluate the absorption variation in the amplifier due to the different conditions of absorption and saturation.

The incident pump power on the crystal is advantageously of 212 W. The pump power absorbed in the absence of laser effect is then of 74 W but, due to a high absorption saturation, this value increases drastically during the operation of the amplifier. The maximum amplified power ($P_{tot}$) taking into account the output beam of the coupler (POC) and the leaks (4×$P_{leak}$) is of 97.3 W for an equivalent coupler of 22%. The wavelength of the produced beam is of 1034 nm. The theoretical efficiency of the laser (laser power with respect to the absorbed pump power) is excellent and reaches 65%. This value is calculated considering the corrected absorbed pump power during the laser operation. Indeed, this absorption during the laser operation is twice compared to a measurement without laser effect. This is due to a drastic reduction of the pump absorption saturation. It is observed that this correction is rarely made in the prior publications (related to the ytterbium-based laser materials), which disclose efficiencies reaching 80 to 90%. By way of comparison with these works, without this correction, our efficiency would reach 131%!

According to a preferred embodiment, the crystal is oriented so as to maximize the power of only one output, by recoupling in the cavity two of the Fresnel reflections. The optimum output of the coupler 10 is then of 20% in transmission and the mean output power is of 62 W.

The second criterion of evaluation relates to the low signal gain of the Yb:CaF$_2$ crystal in the prospect of developing a short pulse amplifier. To better measure the gain, the mean power is evaluated as a function of the losses by varying the transmission of the output coupler (cf. FIG. 5). The maximum gain corresponds to 68% of the losses, which leads to a gain of 3.1 (for a round trip in the cavity). Let's consider now a round trip in a 2.2% ytterbium-ions-doped crystal (N=5.4 10$^{20}$ ions/cm$^3$) having a wavelength of 5 mm. The formula of the low signal gain is used, which gives a gain cross section of 0.21 10$^{-20}$ cm$^2$ at a wavelength $\lambda_0$ equal to 1034 nm, with an active-ion population inversion rate of 0.45. This high inversion value confirms, on the one hand, the very high absorption efficiency, and on the other hand, the high absorption saturation without laser effect.

Figure 6:
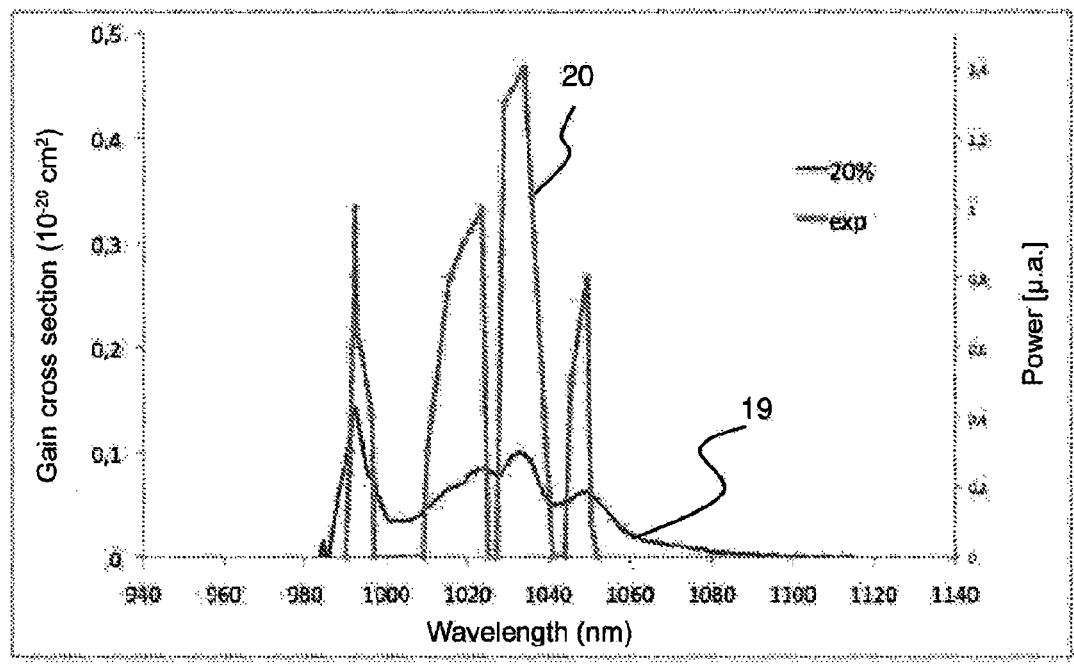
FIG. 6 shows the power going out from a laser cavity using an amplifier according to the invention, measured experimentally. On the same figure is shown the theoretical gain spectrum for an active-ion population inversion rate of 20%.

The third criterion relates to the wavelength tunability. FIG. 6 shows an experimental measurement of tunability of the cryogenized laser (dash lines) and a curve of gain cross section at 77 K (continuous line). It can be seen that the two curves correspond very well to each other and indicate four different spectral regions centered on 992 nm, 1020 nm, 1034 nm and 1050 nm, respectively. Despite the spectrum modification obtained at the cryogenic temperature, the bandwidths are relatively spread, especially in the region of 1010-1040 nm, which makes the amplifier also interesting for amplifying short pulses. It can be noted that the maximum gain is at 992 nm, which explains that it may be used for a high-power natural laser effect with an extremely low quantum defect ρ of 1.1%.

The described amplifier has thus extremely interesting thermal and spectroscopic properties: a high mean power, a very high efficiency when placed in a laser cavity.

The relative proximity of the emission wavelength and of the pump wavelength, which are typically separated by a few tens of nanometers, imposes very strong constraints on the means for multiplexing these waves in the amplifying medium. FIGS. 1 to 4 each show a particular multiplexing mode.

In FIGS. 1 to 4, an amplifying medium 1 contained in an enclosure 2, called the cryogenic enclosure, which keeps this amplifying medium at a low temperature, is pumped by a laser diode 4, for example at 981 nm. An imaging system, comprising an optical fiber 5 and two sets of lenses 6 and 6', focuses the light flux of the laser diode 4 on the amplifying medium 1.

FIG. 1 shows an embodiment of the invention implementing a modal multiplexing 9. This multiplexer 9 is a partially occulting mirror. It has anti-reflective properties over the essential of its surface, except a small disc at the center thereof, for the pump wavelength, advantageously of 980-990 nm. On the contrary, the small disc at the center is very reflective in this spectral domain. The beam to be amplified goes through the amplifying medium along the axis 7, and the multiplexer 9 send back the emission beam along the axis 8.

Figure 2:
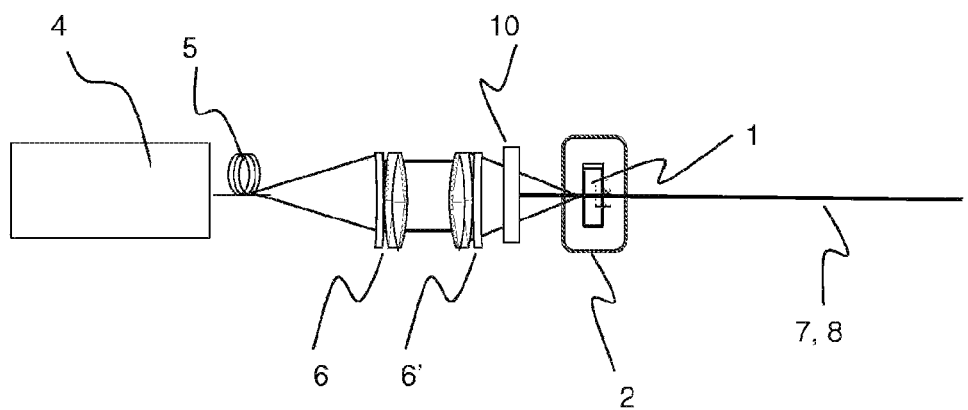

FIG. 2 shows an embodiment of the invention implementing a spectral multiplexing. The filter 10 is a dichroic filter having a precise cut-off frequency between the wavelength of the pump beam and that of the emission beam. It has anti-reflective properties at the pump wavelength, here 981 nm, and is very reflective at the emission wavelength, here from 992 nm. The beam to be amplified and the emission beam are schematized along to the same axis 7, 8.

Figure 3:
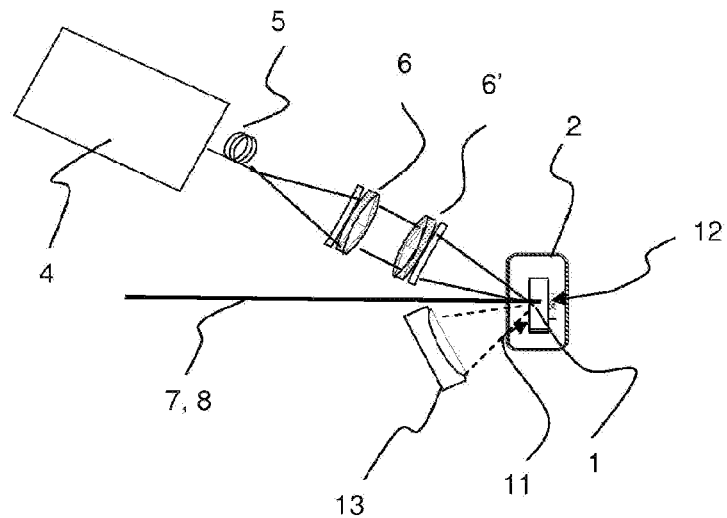
Figure 4:
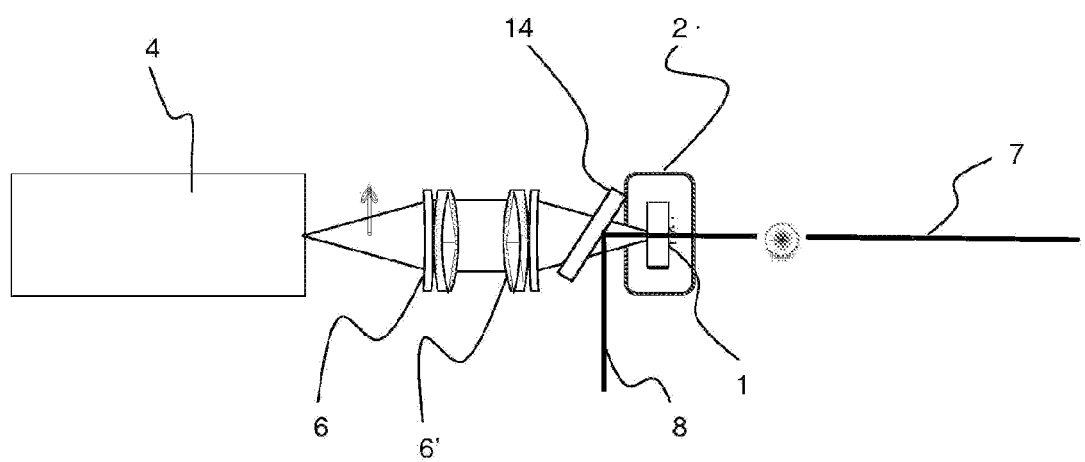

FIG. 3 shows an embodiment of the invention implementing an angular multiplexing. The pump beam is spatially (angularly) separated from the emission beam. The faces of the amplifying medium 1 are advantageously treated. The input face 11 is covered with a treatment that is anti-reflective at the wavelengths comprised between 980 and 990 nm, the opposite face 12 is treated so as to be, on the contrary, highly reflective at these same wavelengths. A mirror 13 may advantageously collect the pump flux reflected by the amplifying crystal and send it back toward the latter. FIG. 4 shows an embodiment of the invention implementing a polarization multiplexing. The pump beam and the emission beam are polarized orthogonally relative to each other. A polarizer 14 transmits the pump wave and reflects the emission wave.

The amplifier is thus an optical amplifier using a solid crystal (for example, Yb:CaF$_2$) cooled at a cryogenic temperature and an emission line of which is used, which is very close to the pump wavelength (the difference between the pump and the emission wavelengths being preferably comprised between 50 and 150-200 cm$^{-1}$), instead of using the conventional emission lines at higher wavelengths.

Figure 5:
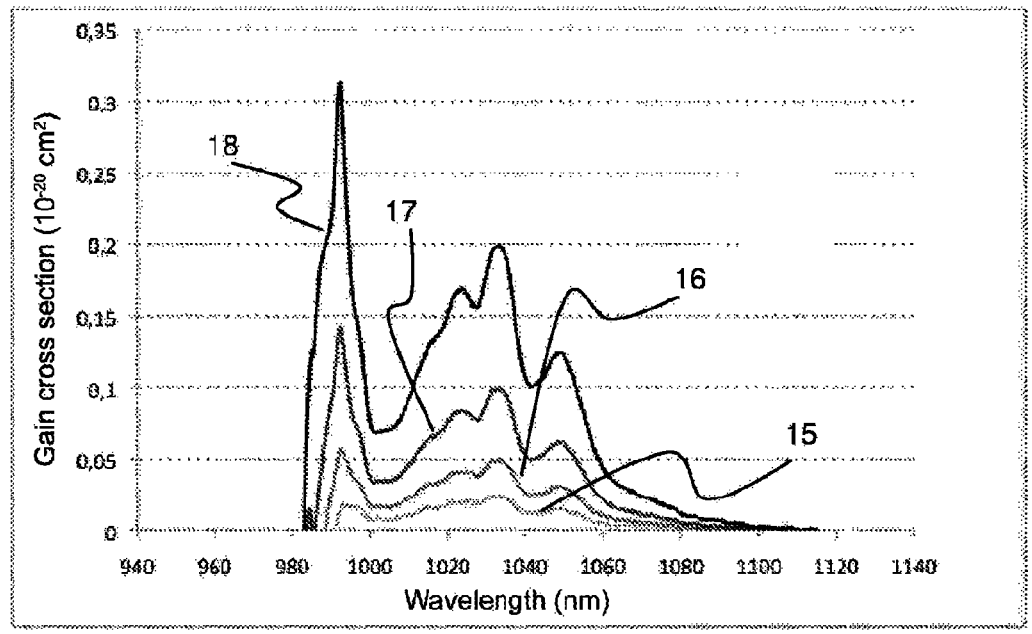
FIG. 5 shows the gain cross section of Yb:CaF$_2$ at 77 K as a function of the wavelength for various active-ion population inversion rates.

FIG. 5 shows the gain spectrum of Yb:CaF$_2$ at 77 K as a function of the wavelength, according to the active-ion population inversion rate. In ordinates is shown the gain cross section with a unit of $10^{-20}$ cm$^2$, in abscissa, the wavelength in nanometers. The curve referred to as 15 corresponds to a population inversion of 5%, the one referred to as 16 corresponds to a population inversion of 10%, the one referred to as 17 corresponds to a population inversion of 20%, the one referred to as 18 corresponds to a population inversion of 40%.

FIG. 6 shows the experimental performances of an Yb:CaF$_2$ amplifying medium at 77 K, placed inside a spectrally tunable laser cavity (curve 20), compared with the gain spectrum (FIG. 5) for an active-ion population inversion rate of 20% (curve 19). The left ordinates represent the gain cross section for the curve 19. On the right is shown the output power for the curve 20.

These curves highlight the interest of the invention and the possibility it offers to obtain a very high amplification gain at 992 nm.

The invention allows in particular improving the amplification gain and reducing the heat deposition in the solid amplifying medium. A laser is obtained, which has a "natural" laser line at 992 nm and a very high figure of merit (improvement by a factor 3 to 10). The low signal gain of the laser is evaluated to 3.1.

The invention allows applications to laser amplifiers with high gain, with high mean power in continuous regime or in nanosecond, picosecond, femtosecond pulse regime, and possibly with high energy. The invention applies in particular to the making of a so-called "booster" amplifier to amplify a low energy, low power pulse.

The invention claimed is:

1. A high-gain optical amplifier for a wave to be amplified at a wavelength referred to as the emission wavelength, comprising:
    means for optical pumping producing a pump wave at a wavelength referred to as the pump wavelength;
    a solid amplifying medium that is doped with ytterbium active ions, said solid amplifying medium being capable of emitting laser radiation at an emission wavelength when pumped by said pumping means;
    means for cooling capable of cooling said solid amplifying medium; and
    means for optical multiplexing capable of coupling together the pump wave and the wave to be amplified in the amplifying medium;
    wherein:
    the solid amplifying medium is cooled to a temperature lower than 150° K,
    the solid amplifying medium is a ytterbium-doped fluoride,
    the solid amplifying medium has Stark sublevels contained within a spectral domain ranging over less than 200 cm$^{-1}$ or about 20 nm when expressed in wavelength,
    the pump wavelength is between 980 and 990 nm,
    the emission wavelength is higher than 990 nm, and
    a quantum defect ρ of said amplifying medium is lower than 2%.

2. The optical amplifier according to claim 1, wherein said fluoride is selected from the group consisting of YLF, KYF$_4$, LiLF, BYF, CaF$_2$, SrF$_2$, and BaF$_2$.

3. The optical amplifier according to claim 1, wherein the amplifying medium is Yb:CaF$_2$, the pump wavelength is 981 nm, and said amplifying medium is capable of amplifying a wave at 992 nm.

4. The optical amplifier according to claim 1, wherein a host matrix is selected from zirconia, Scheelites or tungstates.

5. The optical amplifier according to claim 1, wherein said means for multiplexing comprise a filter chosen from among an interferential filter, a Volume Bragg grating, a polarizing optical component and/or an optical component capable of angularly separating a beam along a pump axis from a beam along an emission axis, or a modal filter.

6. A laser comprising a resonant optical cavity and an amplifier according to claim 1.

7. A high-gain optical amplifier for a wave to be amplified at a wavelength referred to as the emission wavelength, comprising:
    an optical pump producing a pump wave at a wavelength referred to as the pump wavelength;
    a solid amplifying medium that is a crystal doped with ytterbium active ions, said solid amplifying medium being capable of emitting laser radiation at an emission wavelength when pumped by said optical pump;
    a cryostat capable of said solid amplifying medium; and
    an optical multiplexer capable of coupling together the pump wave and the wave to be amplified in the amplifying medium;
    wherein:
    the solid amplifying medium is cooled to a temperature lower than 150° K,
    the solid amplifying medium is a ytterbium-doped fluoride, the solid amplifying medium has Stark sublevels contained within a spectral domain ranging over less than 200 $cm^{-1}$ or about 20 nm when expressed in wavelength,
the pump wavelength is between 980 and 990 nm,
the emission wavelength is higher than 990 nm, and
a quantum defect $\rho$ of said amplifying medium is lower than 2%.

8. The optical amplifier according to claim 7, wherein said fluoride is selected from the group consisting of YLF, $KYF_4$, LiLF, BYF, $CaF_2$, $SrF_2$ and $BaF_2$.

9. The optical amplifier according to claim 7, wherein the amplifying medium is Yb:$CaF_2$, the pump wavelength is 981 nm, and said amplifying medium is capable of amplifying a wave at 992 nm.

10. The optical amplifier according to claim 7, wherein a host matrix is selected from zirconia, Scheelites or tungstates.

11. The optical amplifier according to claim 7, wherein said multiplexer comprises a filter chosen from among an interferential filter, a Volume Bragg grating, a polarizing optical component and/or an optical component capable of angularly separating a beam along a pump axis from a beam along an emission axis, or a modal filter.

12. A laser comprising a resonant optical cavity and an amplifier according to claim 7.

* * * * *